Dec. 13, 1960     B. J. LAMBERTY     2,964,702
APPARATUS FOR MEASURING IMPEDANCE
Filed Nov. 13, 1958     5 Sheets-Sheet 1

INVENTOR.
BERNARD J. LAMBERTY
BY John F. Lawler
ATTORNEY

Dec. 13, 1960      B. J. LAMBERTY      2,964,702
APPARATUS FOR MEASURING IMPEDANCE
Filed Nov. 13, 1958      5 Sheets-Sheet 3

INVENTOR.
BERNARD J. LAMBERTY

BY John F. Lawler
ATTORNEY

Dec. 13, 1960 B. J. LAMBERTY 2,964,702
APPARATUS FOR MEASURING IMPEDANCE
Filed Nov. 13, 1958 5 Sheets-Sheet 4
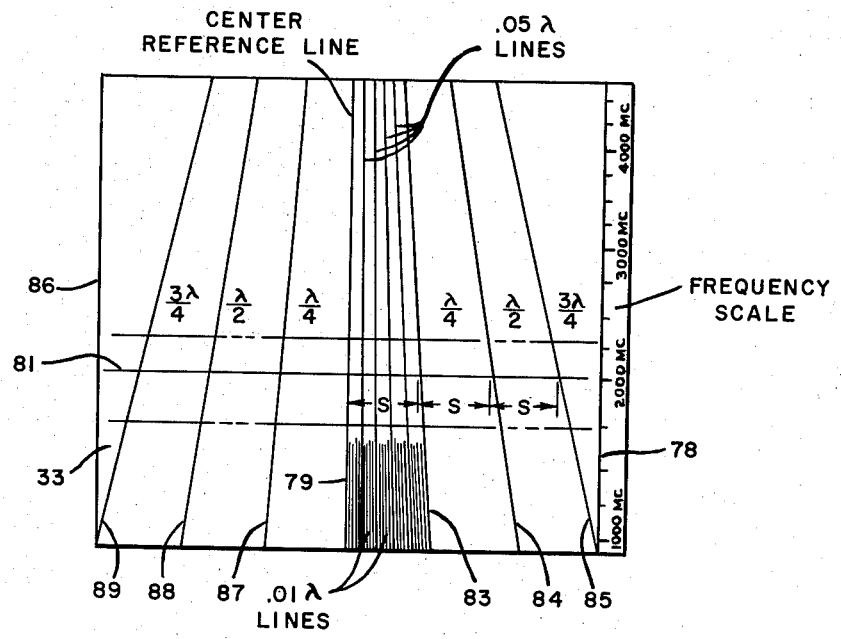
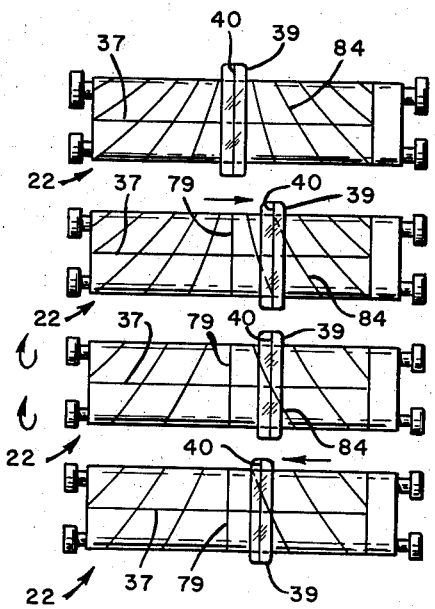
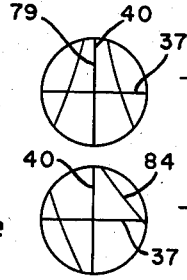
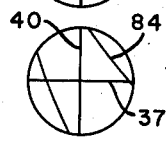
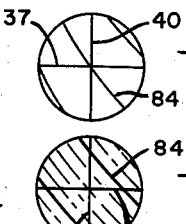
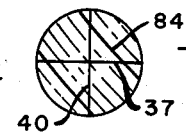
*INVENTOR.*
BERNARD J. LAMBERTY
BY John F. Lawler
ATTORNEY INVENTOR.
BERNARD J. LAMBERTY
BY John F. Lawler
ATTORNEY

United States Patent Office 2,964,702
Patented Dec. 13, 1960

2,964,702

APPARATUS FOR MEASURING IMPEDANCE

Bernard J. Lamberty, Mountain View, Calif., assignor, by mesne assignments, to Sylvania Electric Products Inc., Wilmington, Del., a corporation of Delaware Filed Nov. 13, 1958, Ser. No. 773,601

3 Claims. (Cl. 324—58)

This invention relates to microwave measuring apparatus and techniques and, more particularly, to an improved method of and apparatus for facilitating the measurement of the impedance of unknown loads on microwave transmission lines in conjunction with the use of a standard slotted line and a Smith chart.

Two methods are commonly employed for measuring impedance and very high or microwave frequencies. One involves the use of complex electronic apparatus in which a signal generator, a superheterodyne receiver, transmission line turning mechanisms, and an image projector for presenting a visual display of impedance measurements are packaged together as a unit. The chief advantage of such an instrument is the speed with which it measures impedance. Its disadvantages are complexity, high cost ($6,000 per unit), large size and weight, requirement of replacement of electronic parts from time to time, and the limited frequency band over which it can operate.

The other method of measuring impedance involves the use of a standard slotted line device for detecting standing wave ratios, and a Smith chart for converting these ratios into useful impedance values. A full explanation of the construction of a Smith chart is given in volume 9, pages 60–67, inclusive, of Radiation Laboratory Series (McGraw-Hill, 1948), and details on the slotted line-Smith chart method of measuring impedance is given on pages 100–106, inclusive, of Electronic and Radio Engineering by Terman (McGraw-Hill, 1955, 4th Ed.). The equipment utilized in the practice of this well-known technique is relatively inexpensive, the slotted line itself costing less than $500.00, and the rest of the units, such as the signal generator and VSWR meter, being part of standard laboratory apparatus. The principal disadvantage of the slotted line method as now generally practiced is that it is slow. In addition, two steps require slide rule calculation which dictates a certain level of operator capability and skill, and at the same time makes the measurements more susceptible to human error. These considerations coupled with the fact that in a modern electronic manufacturing plant and/or laboratory, hundreds and even thousands of impedance data point measurements per day may be made, have economically justified large capital investment in the aforementioned expensive electronic equipment simply in order to save operator time.

The present invention is concerned with apparatus and a technique for making slotted line impedance measurements with a speed and accuracy that is comparable to that achievable with the apparatus first described above, but with a minimum of expense or investment. Briefly, my invention consists of frequency conversion mechanism adapted to be attached to the housing of a slotted line. This mechanism gives readings directly in terms of wavelengths and is constructed so as to convert physical distances over which the probe of the slotted line is moved into fractional parts of a wavelength at a predetermined frequency. The carriage on which the probe is mounted preferably carries a transparent indicator which overlies the conversion mechanism for indicating the position of and displacement of the probe carriage relative to the frequency converter.

In one form of the invention this frequency converter comprises an axially movable carriage with a transversely adjustable chart calibrated to read in wavelengths. The chart contains a plurality of lines running transversely of the direction of chart carriage movement. The interline spacings decrease uniformly from a maximum to a minimum over the length of the chart and correspond to fractions of a wavelength for a wide range of frequencies. The chart is mounted on rolls to conserve space. In another form of the invention an adjustable mechanical scale is used in lieu of the chart to convert distances into wavelengths. These conversion mechanisms eliminate the necessity of recording and calculating frequency in terms of wavelengths for each data point measurement and thus achieve a considerable saving of time. Simple directions prominently displayed on the converter mechanism remind the operator of the correct direction of rotation on the Smith chart so that this common source of error in the use of conventional impedance measuring apparatus and techniques is virtually eliminated. In gross, the operation of the slotted line apparatus for each data point measurement is greatly simplified by the use of the frequency conversion mechanism according to my invention and considerable savings through more rapid measurement of impedance and from the minimum investment in the measuring equipment are achievable, as well as through use of unskilled operators without sacrifice of accuracy or reliability.

A general object of the invention is the provision of improved apparatus for and technique of making impedance measurements with a slotted line.

Another object is the provision of inexpensive apparatus for greatly reducing the time required to make impedance measurements with a slotted line.

A further object is the provision of such apparatus which operates over a wide range of frequencies.

Another object is the provision of a technique of making such impedance measurements with fewer and more simplified steps, thereby minimizing operator error and increasing accuracy and reliability of the results.

Still another object is the provision of a frequency converter attachment designed to be mounted on a standard slotted line housing without extensive modification of the housing.

Other objects are the provision of a lightweight, compact frequency converter for slotted lines; the elimination of slide rule calculations in measurement of impedance by the slotted line technique; the provision of sturdy, reliable measuring mechanism that has no vacuum tubes or similar sensitive electronic parts; and the provision of measuring apparatus that can be used by unskilled operators without sacrifice of accuracy.

These and other objects of my invention will become apparent in the following description of preferred and modified forms thereof, reference being had to the accompanying drawings in which.

Figure 6:
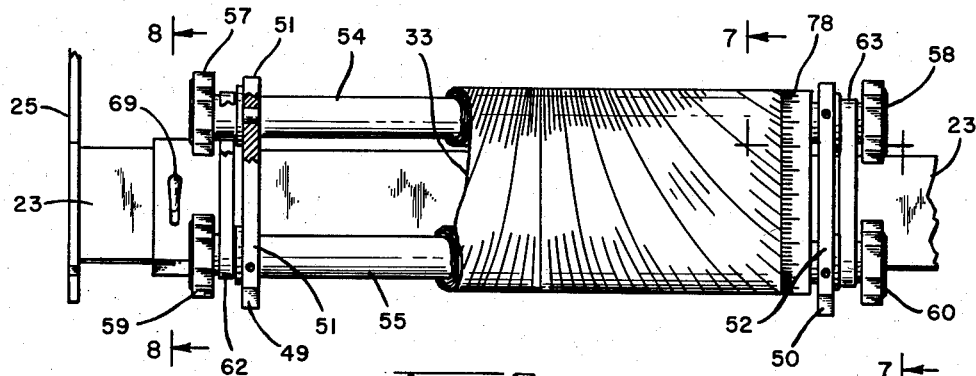
Figure 6 is a front view of the chart and roller mechanism of the chart carriage, the chart and part of the assembly being cut away to show details of construction.
Figures 7, 8:
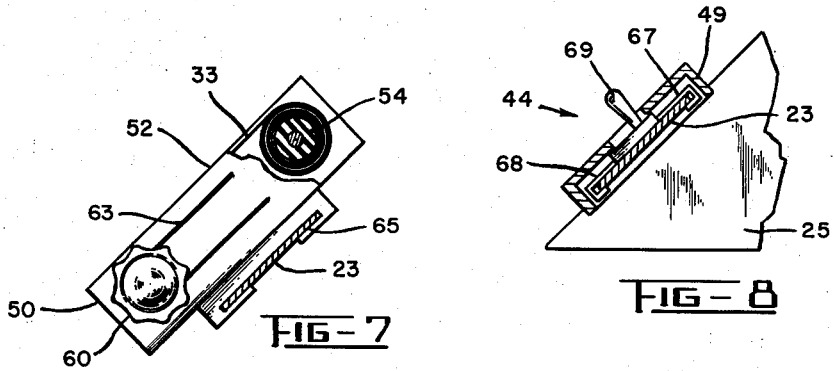

Figures 7 and 8 are transverse sections of the chart carriage taken on lines 7—7 and 8—8, respectively, of Figure 6.

Figure 9:
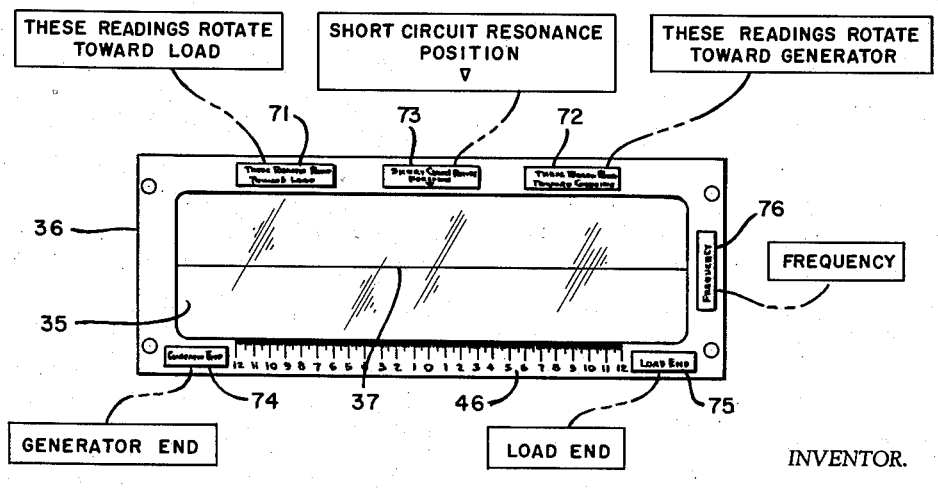

Figure 9 is a plan view of the view window and frame which overlies the chart.

Figure 10 is a plan view of the unrolled frequency conversion chart showing the wavelength indicating lines, certain of which have been omitted more clearly to illustrate the chart construction.

Figures 11–14, inclusive, are schematic drawings of the chart carriage and probe position indicator, showing in sequence the relative position of the probe indicator and the chart during the measurement operation. Figures 11A–14A, inclusive, are magnified portions of Figures 11–14, respectively, showing the superimposed intersection of the probe indicator line, the window reference line and with the wavelength lines on the chart.

Figure 15:
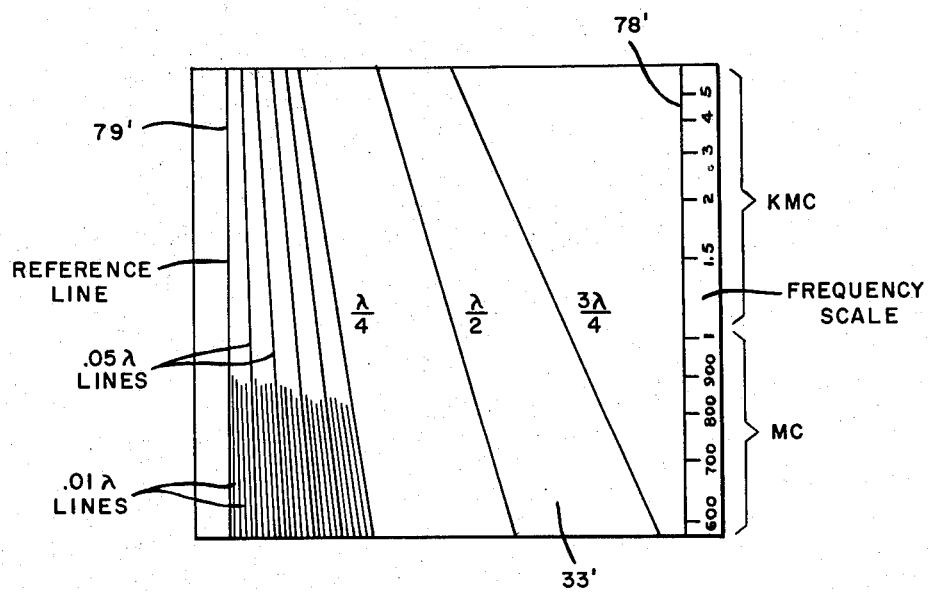

Figure 15 is a plan view, similar to Figure 10, of a modified frequency chart wherein the zero or reference line is located at one side of the chart.

Figure 16:
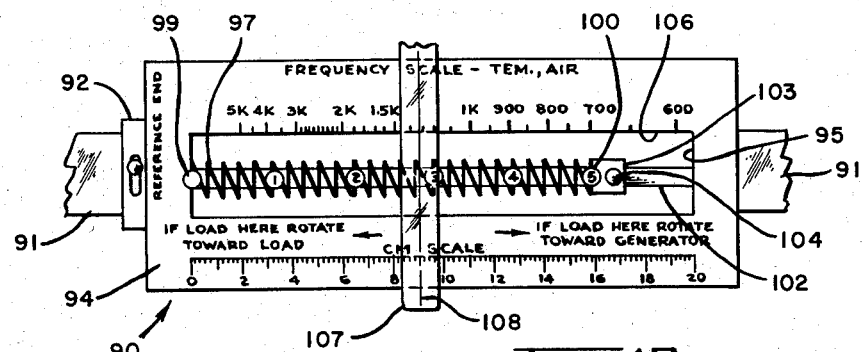

Figure 16 is a plan view of a modified frequency conversion mechanism comprising a calibrated spring and a frequency scale on an axially movable carriage.

Figure 17:
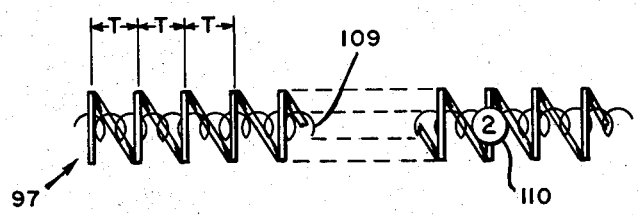

Figure 17 is an enlarged fragmentary elevation of the spring mechanism of Figure 16.

(1) Introduction

A more comprehensive understanding and appreciation of the instant invention will be gained from an explanation of the conventional method of and apparatus for making impedance measurements with slotted lines upon which the invention is an improvement. The following discussion comprehends this object and is directed particularly to Figures 1–4, inclusive, of the drawings.

Figure 1:
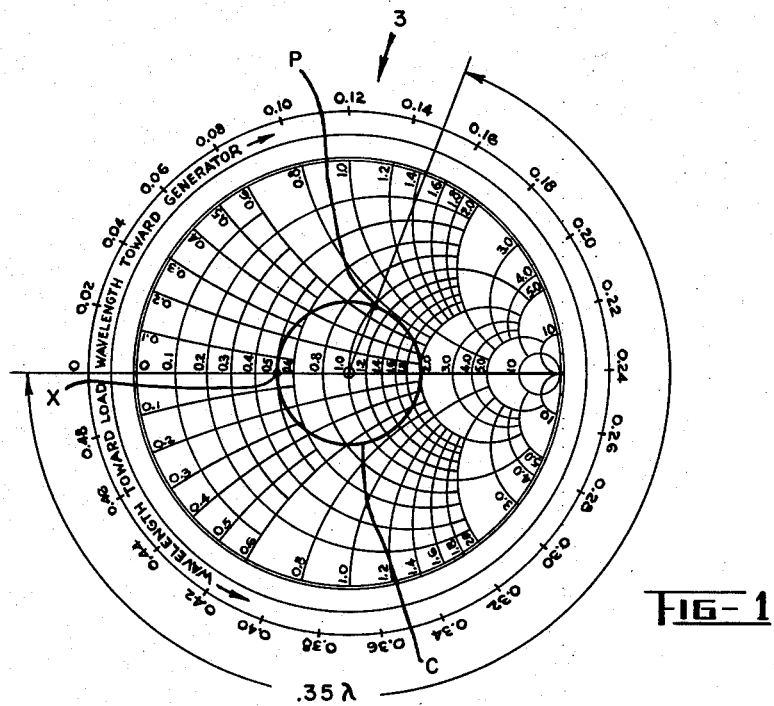
Figure 1 is a schematic representation of a Smith chart.
Figure 2:
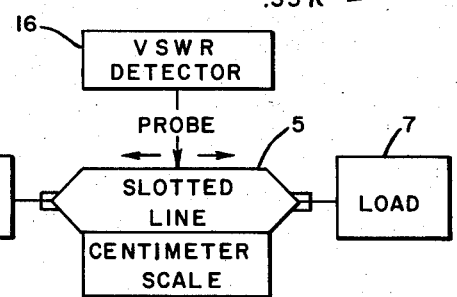
Figure 2 is a simplified block diagram of typical apparatus used in making impedance measurements with a slotted line.
Figure 3:
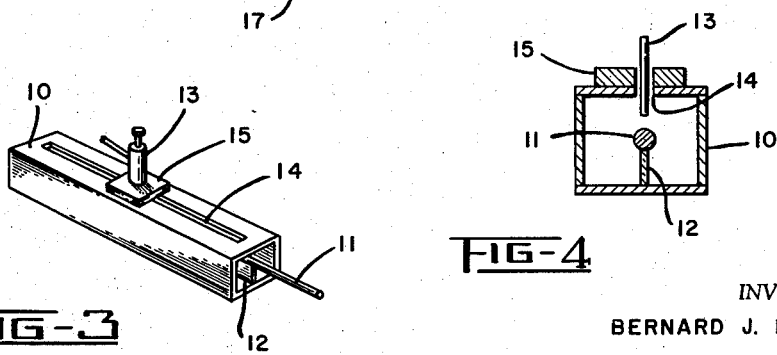
Figure 3 is a perspective view of a standard slotted line device in which the outer conductor of the coaxial line has parallel sides.
Figure 4:
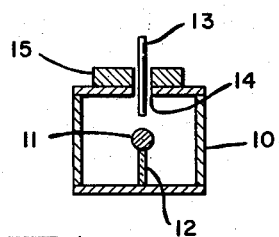
Figure 4 is an enlarged transverse section of the slotted line of Figure 3.

The Smith impedance chart 3, shown in Figure 1, is a graphic calculator used to determine true impedance values from data derived from apparatus shown in Figure 2 and comprising a slotted line 5 having a high frequency generator 6 and a load 7 of unknown impedance connected to its input and output ends, respectively. The slotted line comprises an outer conductor 10, which may be rectangular in cross-section, as shown in Figures 3 and 4, an inner conductor 11 on dielectric support 12, and a probe 13 which extends through an axial slot 14 in the outer conductor and which is movable to selected longitudinal positions on the line by means of a probe slide 15. The probe samples energy from the slotted line and the detector 16 to which the probe is connected indicates the standing wave ratio as well as voltage maxima and minima within the slotted line. Travel of the probe along the slotted line is measured on a linear scale 17.

The impedance of the load 7 is measured in accordance with the following procedure wherein numerical data are given by way of example:

(1) Generator 6 is set to the desired frequency (2,500 mc.) and a short circuit is placed across the connector to load 7.

(2) Move slide 15 until a voltage minimum is indicated on detector 16, and record the slide position reading (22 cm.) of scale 17.

(3) Repeat (2) for the adjacent voltage minimum and record the scale reading (42 cm.) for this new position of the slide.

(4) Subtract (3) from (2) and multiply by 2 to get value of a wavelength (40 cm.).

(5) Remove the short circuit from the load and read the VSWR (2.0) on the detector 16.

(6) Move probe toward the generator to a new minimum voltage position adjacent to (2) and record slide position in centimeters (36 cm.).

(7) Subtract (2) from (6) to determine the difference (14 cm.).

(8) Calculate (by slide rule) the ratio of (7) to (4) which is .35.

(9) Draw a circle (C) whose radius equals the VSWR found in (5) on the Smith chart 3.

(10) Move along the circle in (9) from the zero resistance and reactance point ($x$) by a distance equal to the value in (8), viz., 0.35λ and in a counterclockwise direction toward the load (opposite to the movement in (6)) in order to locate the point P having coordinates equal to 0.98 and j0.7; these numbers multiplied by the characteristic impedance of the line gives the impedance of load 7.

In accordance with my invention, steps (4), (7), and (8) in the above procedure are eliminated completely. Moreover, the necessity of reading and recording slide positions (steps (2), (3) and (6)) is obviated and the possibility of confusion of the operator as to the direction in which to move on circle C of the Smith chart (step 10) is greatly reduced. All in all, average time savings of greater than 50% have been achieved through the practice of the invention. The apparatus for and manner in which this saving is realized will now be described.

(2) *Apparatus in general*

Figure 5:
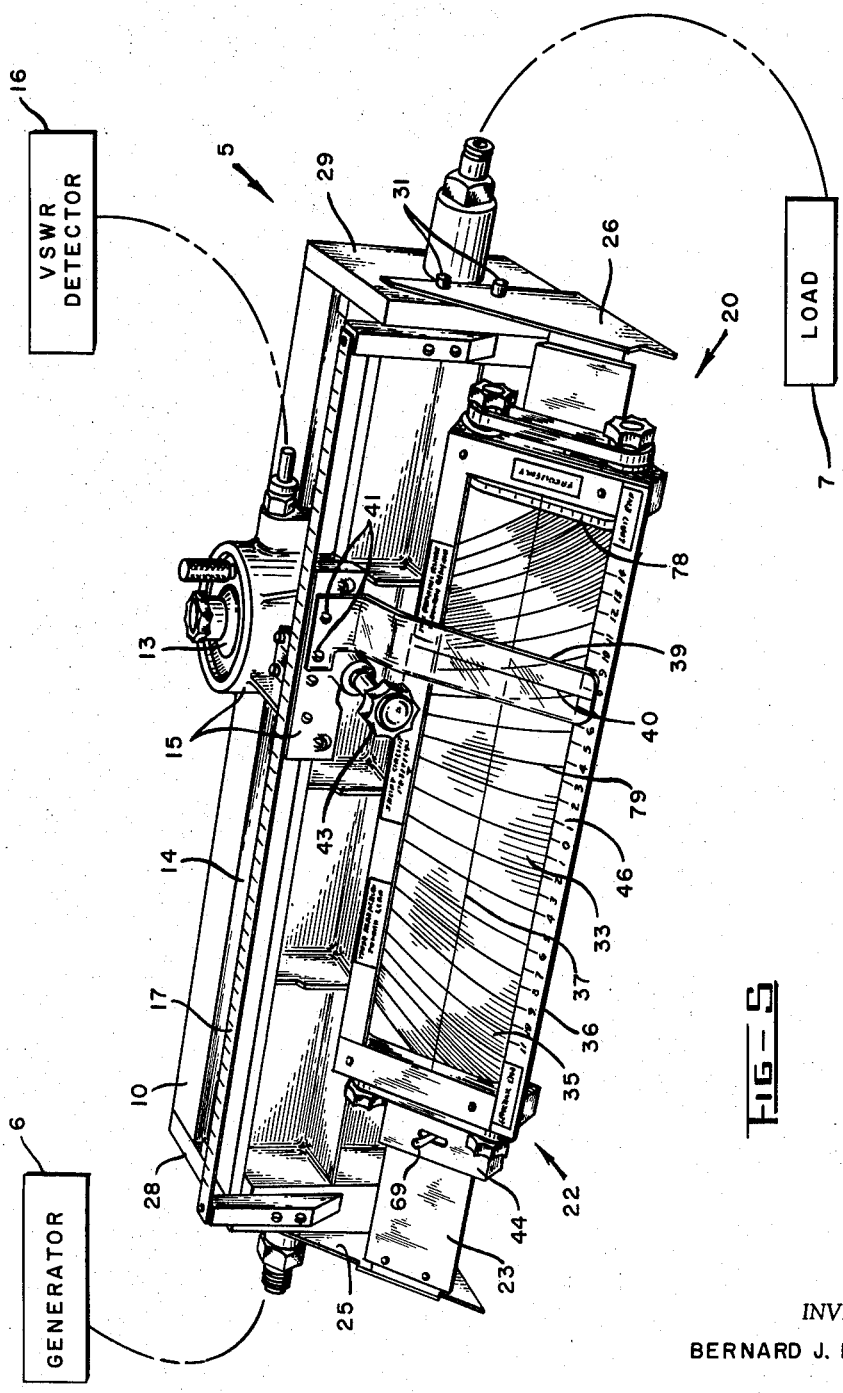
Figure 5 is a perspective view of a slotted line device equipped with a frequency converter attachment embodying my invention, the converter shown being in the form of a chart and carriage.

Figure 5 illustrates the combination of the slotted line assembly 5 and a frequency converter mechanism 20 comprising a chart carriage 22 mounted for movement relative to the slotted line along a rail 23. Integral flanges 25 and 26 on the ends of rail 23 are detachably secured to the end walls 28 and 29 of the slotted line, each by a pair of screws, one pair 31 being shown in the drawing. The chart carriage and rail may be attached to or removed from the slotted line housing simply by means of these four screws, and the housing merely requires four tapped holes for these screws in order to adapt the housing to receive the chart carriage and rail assembly. A lock mechanism on one end of the carriage secures the latter in selected positions along the rail 23.

Carriage 22 comprises a chart 33 (see Figures 6 and 10) across the face of which are inscribed a plurality of lines which extend transversely of the direction of carriage movement on the rail and which are spaced in the direction of carriage movement by distances equal to fractions of a wavelength for particular frequencies. The construction of this chart will be more fully explained hereinafter. The portion of the chart which is exposed to view is covered by a view window 35 mounted in a frame 36 and across which is marked a horizontal index line 37 which is parallel to the direction of carriage movement. A probe positioned indicator 39 comprising a transparent arm on which an index line 40 is marked is fastened by screws 41 to the front face of the probe slide 15 and overlies window 35 such that the index lines 37 and 40 preferably are substantially perpendicular to each other. The horizontal index line 37 on the window appears to intersect the lines on the chart such that the spacing of the latter along the index line represents subdivisions of a wavelength at one frequency on the chart. The axial displacement of probe slide 15 on the slotted line is measured with respect to the wavelength lines on the chart by observing the distance which probe index line 40 moves with respect to horizontal index line 37, and then reading this distance directly in fractions of a wavelength on the chart. Slide 15 is provided with a suitable clamp operated by knob 43 in order to releasably lock the slide, and with it the probe, in any selected longitudinal position on the slotted line. Similarly chart carriage 22 has a lock device, indicated generally at 44, for releasably securing the carriage in selected positions along rail 23. A linear scale 46 on the lower portion of the window frame 36 over which probe position indicator 39 extends provides an index to aid the positioning of the chart carriage relative to the probe slide.

(3) Chart carriage and chart

The structure of chart carriage 22 is shown in Figures 6-9, inclusive, and comprises transverse frame members 49 and 50 having front edges 51 and 52 on which window frame 36 seats and is secured. Suitably journaled in these frame members are chart rolls 54 and 55 on which chart 33 is wound in the manner of a scroll. End extensions of chart rolls 54 and 55 are fitted with knurled knobs 57, 58, 59 and 60 to permit turning the rolls in the proper direction for adjusting the chart. In order to synchronize rotary movement of the two rolls and thus maintain proper tension on the chart paper, flexible friction belts 62 and 63 are provided which engage the rolls shafts at opposite ends of the carriage.

The rear edge of each of frame members 49 and 50 has a dovetail recess 65 (see Figure 7) through which rail 23 extends, there being sufficient play in this fit to permit relatively easy movement of the chart carriage along the rail without binding. The carriage lock mechanism 44, see Figure 8, may comprise a pair of clamp segments or shoes 67 and 68 which fit over the longitudinal edges of the rail and which are actuated by a convenient lever 69 to engage and release the rail.

Window frame 36 has a border of sufficient width to accommodate chart identifying labels or legends which clearly indicate to the operator the proper direction to move on the Smith chart in accordance with data read from chart 33. For example, label 71 states: "These readings rotate toward the load," which reminds the operator that with data read from the left hand portion of the chart, as viewed, movement on the Smith chart from its reference line is in load or counterclockwise direction. Similarly, label 72 serves to remind that readings taken from the right hand portion of the chart require the operator to rotate in a clockwise direction on the Smith chart. Label 73 has an arrow which points to the zero or center reference line on the chart, designated "Short circuit resonance position." These labels assist the operator to properly interpret the chart data and, more specifically, to clearly indicate in which direction to move on the Smith chart for a particular direction of movement of the probe slide. Labels 74 and 75 indicate which end of the slotted line is to be connected to the generator or load and label 76 identifies the frequency scale on the side of the chart. The linear scale 46 on the bottom of the frame has a center zero point aligned with the zero line on the chart and serves to indicate distances in linear units for the positions of the probe slide relative to the chart carriage.

Chart 33, see Figure 10, has a logarithmic frequency scale 78 marked along one of its side borders, the right side as viewed, and this scale is plotted directly in cycles per second for a desired range of frequencies, for example, from 1,000 mc. to 4,000 mc. The lateral dimension of the chart is divided equally by a center reference line 79 which is parallel to the frequency scale 78. The space between center line 79 and frequency scale 78 is subdivided by a plurality of lines which are spaced apart by distances equal to the actual wavelengths corresponding to frequencies on the frequency scale. For example, refer to line 81 which is drawn normal to the frequency scale and intersects the latter at the 2,000 mc. mark. The distance S along line 81 between quarter wavelength lines 83, 84 and 85 is determined by the relation $$\lambda = \frac{c}{f}$$

where $c$ is the velocity of light in centimeters per second $f$ is the frequency in megacycles, and $\lambda$ is the wavelength in centimeters. In this case, the wavelength at 2,000 mc. is equal to 15 centimeters, and the distance S is a quarter-wavelength or 3.75 centimeters. Accordingly, lines 83, 84 and 85 are spaced 3.75 centimeters apart along line 81 and are spaced respectively from center reference line 79 by 3.75 cm. ($\lambda/4$), 7.50 cm. ($\lambda/2$) and 11.25 cm. ($3\lambda/4$). The spacing between wavelength lines, of course, diminishes from a maximum at the low end of the frequency scale to a minimum at the upper end, as shown. The number of wavelength subdivision lines marked on the chart will be dictated by the accuracy of readings desired, and we have found that divisions down to $0.01\lambda$ has proven satisfactory for most applications. For the sake of clarity of illustration of the chart in Figure 10, only a few of the $0.01\lambda$ lines have been shown, it being understood that the entire half of the chart is calibrated in $0.01\lambda$ lines.

The opposite half of the chart between center reference line 79 and the left hand border 86 is similarly subdivided by wavelength lines, such as quarter wavelength lines 87, 88 and 89. Since the reference or zero line is in the center, the left half of the chart is, in essence, a mirror image of the right half.

It will be noted that a horizontal index line, such as the horizontal line 37 on view window 35 provides a reference line similar to the above mentioned 2000 megacycle reference line 81 for indicating fractions of wavelength spacing at selected frequencies on the scale at the right side of the chart. Therefore, the travel of a point along index line 37 of the window, such point being, for example, the point of intersection of line 37 with probe indicator line 40, is measured directly in fractions of a wavelength on the chart. In this manner the chart provides direct conversion of longitudinal displacement of the probe into wavelength units over a wide range of frequencies.

The center reference line 79 on the chart is a zero or starting point for the probe indicator line at the beginning of each data point measurement; that is, the relative positions of the chart carriage and the probe slide are such that the probe indicator line 40 is aligned with chart line 79 when measurements are begun. The operator has the option of using either the right hand or the left hand portion of the chart. If, during the measurement of the data point, it is desired to move the probe from a zero reference line 79 in a direction toward the load, the right hand portion of the chart is used. Conversely, if the probe initially is moved from center reference line 79 toward the generator, the left hand portion of the chart is used. It will be noted that the labels 71 and 72 on the window frame border clearly indicate to the operator in which direction he should move on the Smith chart with data taken from the conversion chart 33.

(4) Operation

The operation of the frequency conversion mechanism in conjunction with the slotted line for making an impedance measurement will be better understood by reference to Figures 11-14, inclusive, and Figures 11A-14A, inclusive. The measuring apparatus is arranged initially with the signal generator 6 and the load 7 connected to the input and output terminals of the slotted line 5 and with the VSWR detector 16 likewise connected to the output terminal of the probe 13.

The procedure is then as follows:

(1) The generator is tuned to the frequency at which impedance measurements are to be made. The cable at the connector to the load is short-circuited.

(2) Probe slide 15 is moved to a position of minimum voltage as indicated on the VSWR detector, preferably approximately midway between the ends of the slotted line.

(3) The chart carriage 22 is moved relative to the probe slide until the probe indicator line 40 is aligned with or superimposed on chart center reference line 79

(see Figure 11). The chart carriage is secured in this position by lock 44.

(4) The probe carriage next is moved to an adjacent voltage minimum point (or to the nearest maximum voltage point for long wavelengths), see Figure 12.

(5) The chart 33 is advanced by turning the rollers until the λ/2 line 84 (λ/4 line if adjacent maximum point was used) is positioned at the intersection of probe indicator line 40 and the horizontal indicator line 37 on the window. Frequency can now be read directly at the edge of the window.

(6) The short circuit is removed from the connector to the load and a reading of VSWR is made on the detector.

(7) The probe carriage is moved to a position of minimum voltage so that the probe indicator line is less than a half wavelength from center reference line 79 of the chart. The probe displacement in terms of decimal fractions of a wavelength is read from the chart by noting the intersection of index lines 37 and 40, see Figures 14 and 14A.

(8) A circle whose radius corresponds to the value of VSWR found in (6) above is drawn concentric with the center of a standard Smith chart. This corresponds to the circle C in Figure 1.

(9) Locate the unknown impedance on the Smith chart by rotating on the circle in (8) through an arc equivalent to the fractional wavelength determined in (7) above. This locates the point whose coordinates, when multiplied by the characteristic impedance of the slotted line, give the unknown impedance. The direction of rotation on the Smith chart is determined from labels 71 or 72 on the window frame.

The saving in time required to make a data point measurement using the apparatus and procedure according to this invention is readily apparent by comparison of the above steps with those previously outlined for the standard practice using a conventional slotted line and Smith chart. In particular, my invention eliminates the following steps:

(1) The subtraction of readings of the first and second minimum voltage positions of the probe carriage.

(2) Substraction of the new (unshorted load) maximum position from one of the minimum voltage positions for the shorted condition.

(3) Calculation of the ratio of the differences of (1) and (2) above by means of a slide rule.

In addition to eliminating these steps, the invention makes unnecessary the recording of readings because through the sequence of movements of the chart carriage and probe slide a record is automatically maintained. Therefore the operator is not required to translate readings from the measuring device to a paper for future use. The impedance measurement is more reliable because of the fewer steps and the simplified procedure.

In the actual practice of my invention in comparison with the conventional slotted line measuring technique for a series of several hundred data point measurements, it was determined that the new method herein disclosed is 2.42 times faster than the conventional method. The average time required per data point measurement for the old method was 7.15 minutes, and an average of one mistake was committed in every thirty data points. The same operator required an average of 2.95 minutes per data point using the technique and apparatus of this invention and made no mistakes for the entire group of readings.

A modified frequency chart 33' is shown in Figure 15 wherein the zero or reference line 79' is located at the left edge of the chart as distinguished from the central location of the reference line 79 in the chart of Figure 10. The frequency scale 78' is inscribed on the right side of the chart, as before, and the entire width of the chart is graduated in fractions of a wavelength to units as small as .01λ. One advantage of this construction is that a single chart can accommodate a frequency band that is twice that of the chart of Figure 10. Another advantage is that there is less chance of operator error in determining whether to rotate the impedance point toward the generator or toward the load since rotation will always be in the same direction. The labels on the window frame are changed appropriately to accommodate chart 33', but in other respects the chart 33' is constructed and used in the same manner as is chart 33 of Figure 10.

A modified form of my invention shown in Figures 16 and 17 comprises an expandable mechanical scale which may be substituted for the chart in order to convert frequency to wavelength. Carriage 90 corresponds to chart carriage 27 and is similarly mounted for sliding movement along rail 91. In order to releasably hold carriage 90 in selected positions along the rail 91, there is provided a lock mechanism, generally indicated at 92, and adapted to releasably engage the rail in the manner of carriage lock 44 described above. The upper face plate 94 of the carriage corresponds to the window frame 36 of the chart carriage and has an elongated rectangular aperture 95 within which a highly accurate spring 97 is mounted. Spring 97 is flat and has triangular coils which give the spring a saw tooth appearance. The axial spaces T, see Figure 17, between corners on adjacent coils are equal so that the entire length of the spring is divided into a plurality of equal subdivisions. In other words, if spring 97 has $n$ coils, the space T between each coil is equal to $1/n$th of the total axial length of the spring.

Spring 97 is anchored at one end 99 of the face plate aperture and the opposite end 100 is free to move to permit adjustment of the length of the spring. In order to guide and support the free end of the spring, a guide bar 102 is mounted on the face plate under the spring and extends the full length of aperture 95. A slide 103 connected to the free end of the spring is mounted for movement along the bar and a finger operated lock screw 104 on the slide serves to releasably secure the spring in an extended position of desired length. In practice, the spring has 50 coils and the axial length of the spring is equivalent to a half wavelength. The space T between each coil, therefore, is equal to 0.01λ. This spring, then, is a convenient mechanical device for indicating accurately fractions or subdivisions of an adjustable length, and this mechanism is employed to indicate wavelengths or fractions thereof in conjunction with the slotted line apparatus hereinbefore described. The compressed length of the spring equals a half wavelength at the highest operating frequency of the slotted line, and the expanded spring length equals a half wavelength at the lowest operating frequency of the line.

The upper edge 106 of aperture 95 is marked accurately with a series of graduations or marks in which each mark is spaced from the zero or anchored end 99 of spring 97 by a distance equal to half of the wavelength for the frequency designated for the mark. For example, the distance between zero end 99 of the spring and the 5 kilomegacycle mark (abbreviated "5K") is equal to one-half of the wavelength in centimeters at that frequency. Accordingly, when the 50th turn of spring 97 is located directly opposite a selected frequency mark on this scale, say 800 megacycles, the spring length is 17.75 centimeters, which is λ/2 for 800 mc., and the space between adjacent spring coils is 0.01λ or 0.375 centimeter. It will be understood, of course, that the marks on edge 106 may be spaced from the zero end of the spring by fractions of wavelengths other than one-half, and further that the number of coils in the spring may be greater or less than 50. The probe position indicator 107 overlies spring 97 and the displacement of the probe slide along the slotted line measured in fractions of a wavelength is given by the intersection of the probe indicator line 108 with a particular coil.

Preferably, every tenth coil of spring 97 is marked to facilitate reading of such measurements. Such coil marking may be accomplished through color coding the spring coils or by mounting a conventional coiled spring 109 alongside and coextensive with spring 97, and affixing to such spring 109 suitable markers 110 which extend through and identify every tenth coil of spring 97.

The method of measuring impedance with the calibrated spring attachment of Figures 16 and 17 is similar to that desscribed in conjunction with the frequency chart 33, although it will be noted that the spring version, like the chart 33' of Figure 15, has a zero reference point at one end of the carriage. The method is as follows:

(1) The frequency of the generator is set, and the load is short-circuited.

(2) The probe slide is moved to a voltage minimum position, preferably near the left end of the slotted line.

(3) Spring carriage 90 is moved until the probe indicator hairline 108 is aligned with the zero or initial spring coil at point 99. Carriage lock 92 is set to hold the carriage 90 in this position.

(4) The probe slide is moved to the right to the adjacent voltage minimum position.

(5) With lock screw 104 loosened, spring 97 is expanded until the last or fiftieth coil 100, corresponding to 0.5λ (or .25λ if the adjacent maximum point is used) underlies the probe indicator hairline. Screw 104 is locked to secure the spring in this expanded position. Frequency may be read directly from the scale along edge 106 where indicator hairline 108 crosses it.

(6) The short circuit is removed from the load and VSWR is read on the detector. The probe slide is moved to the left to a voltage minimum position located somewhere within the length of the expanded spring. The decimal fraction of a wavelength as indicated by the coil under hairline 108 is read.

(7) On the Smith chart a circle of radius equal to the VSWR reading noted in (6) above is drawn.

(8) Impedance on the Smith chart is located by rotating on the circle in (7) from zero impedance point a distance corresponding to the wavelength reading in (6). This rotation will be "toward the generator" if the zero turn of the spring is at the generator end of the slotted line, or conversely, rotation will be "toward the load" if the spring in anchored at the load end. The coordinates of the point so located on the Smith chart, when multiplied by the characteristic impedance of the slotted line, give the unknown impedance of the load.

The advantage of the calibrated spring type of frequency converter is that it is compact, simple to construct, and requires fewer parts than the chart type converter.

Changes, modifications and improvements may be made to the above described embodiments of my invention without departing from the spirit and precepts of the invention. The scope of the invention is defined in the appended claims.

I claim:

1. In combination, impedance measuring slotted line apparatus having an elongated housing with input and output terminals and an axial slot therein, a probe extending through said slot and movable axially along said housing, a detector connected to the output of said probe, a generator connected to the input terminal, and a load of unknown impedance connected to the output terminal; a carriage supported for movement relative to said housing parallel to the path of movement of said probe, indicator means carried by and movable with said probe and overlying said carriage for indicating relative positions of the probe and carriage, and scale means carried by said carriage and calibrated continuously in subdivisions of wavelengths corresponding to all frequencies in a given frequency range, and means for adjustably moving said scale means relative to said carriage for indicating wavelength subdivisions of any selected frequency in the range of frequencies.

2. In combination with impedance measuring slotted line apparatus having an elongated housing with input and output terminals and an axial slot therein, a probe extending through said slot and movable axially along said housing, a detector connected to the output of the said probe, a generator connected to the input terminal, and a load of unknown impedance connected to the output terminal; a guide member detachably connected to said housing, a carriage supported for movement upon said member parallel to the path of movement of said probe, indicator means movable with said probe relative to the carriage, chart rollers journalled on said carriage for rotation about axes parallel to each other and to the direction of movement of the carriage along said guide member, said rollers being spaced apart transversely of the roller axes, a frequency to wavelength conversion chart extending between and wrapped around said rollers, said chart being calibrated continuously over its length in wavelength subdivisions corresponding to all frequencies in a given range of frequencies, said indicator means being physically positioned relative to said chart whereby to indicate the amount of axial displacement of said probe directly in fractions of a wavelength.

3. In combination, impedance measuring slotted line apparatus having an elongated housing with an axis, said housing having an axial slot therein, a detector probe extending through said slot and supported for axial movement along said housing, a position indicator arm extending outwardly from said probe, a guide rail mounted on said housing, a carriage supported on said rail for movement parallel to said axis and underlying said probe indicator arm, said carriage comprising a plate having an aperture elongated in the direction of probe movement, a spring having a plurality of coils and disposed within said aperture and secured at one end to said plate, slide means supported for movement along said plate and secured to the other end of said spring, means for releasably locking of said slide means along said plate, a scale on said plate adjacent to said spring and calibrated in fractions of wavelengths for a range of frequencies, said slide being adjustable to positions along said scale whereby the spring length is adjusted to correspond to a fraction of the wavelength of a selected frequency, the coils on said spring equally subdividing the spring length into a plurality of subdivisions whereby movement of the probe relative to the carriage is measurable directly in fractions of a wavelength corresponding to the selected frequency.

References Cited in the file of this patent
UNITED STATES PATENTS

| | | |
|---|---|---|
| 1,906,752 | Jasperson | May 2, 1933 |
| 2,454,042 | Dettinger | Nov. 16, 1948 |
| 2,530,955 | Gerber | Nov. 21, 1950 |